US011631206B2

(12) United States Patent
Arora et al.

(10) Patent No.: US 11,631,206 B2
(45) Date of Patent: Apr. 18, 2023

(54) GLYPH SELECTION TOOL FOR DIGITAL TEXT CONTENT

(71) Applicant: Adobe Inc., San Jose, CA (US)

(72) Inventors: Aman Arora, New Delhi (IN); Rohit Kumar Dubey, Chittorgarh (IN)

(73) Assignee: Adobe Inc., San Jose, CA (US)

( * ) Notice: Subject to any disclaimer, the term of this patent is extended or adjusted under 35 U.S.C. 154(b) by 43 days.

(21) Appl. No.: 17/344,269

(22) Filed: Jun. 10, 2021

(65) Prior Publication Data

US 2022/0398790 A1 Dec. 15, 2022

(51) Int. Cl.
*G06T 11/60* (2006.01)
*G06T 15/06* (2011.01)

(52) U.S. Cl.
CPC .............. *G06T 11/60* (2013.01); *G06T 15/06* (2013.01); *G06T 2210/12* (2013.01)

(58) Field of Classification Search
CPC ...... G06T 11/60; G06T 15/06; G06T 2210/12
See application file for complete search history.

(56) References Cited

U.S. PATENT DOCUMENTS

| | | | | |
|---|---|---|---|---|
| 5,588,098 A * | 12/1996 | Chen | ...................... | G06T 19/20 345/653 |
| 5,694,532 A * | 12/1997 | Carey | ................. | G06F 3/04842 715/764 |
| 6,065,021 A * | 5/2000 | George | ................. | G06F 40/103 700/192 |
| 6,842,175 B1 * | 1/2005 | Schmalstieg | ........... | G06F 3/011 345/427 |
| 7,137,077 B2 * | 11/2006 | Iwema | .................. | G06F 3/0481 715/863 |
| 7,218,330 B1 * | 5/2007 | Winkenbach | ....... | G06F 3/04842 345/620 |
| 10,652,470 B1 * | 5/2020 | Manzari | ........... | H04N 5/232935 |
| 2003/0179214 A1 * | 9/2003 | Saund | ..................... | G06T 11/60 345/619 |
| 2003/0179235 A1 * | 9/2003 | Saund | .................. | G06F 3/0481 715/764 |

(Continued)

OTHER PUBLICATIONS

Snider; "Photoshop CC: The Missing Manual, 2nd Edition"; Aug. 2014; O'Reilly Media, Inc. (Year: 2014).*

(Continued)

*Primary Examiner* — Maurice L. McDowell, Jr.
(74) *Attorney, Agent, or Firm* — FIG. 1 Patents

(57) ABSTRACT

Glyph selection techniques are described for digital text content that enable selection of non-contiguous glyphs via input describing at least one path of any shape or form relative to the digital text content. A text selection system receives freeform drawing input defining a path and ascertains a selection scope for outputting a text selection relative to the path. The selection scope indicates whether the text selection is to include glyphs that intersect the path, glyphs displayed within an area enclosed by the path, glyphs displayed outside an area enclosed by the path, or combinations thereof. The text selection system is configured to identify a subset of glyphs for inclusion in the text selection, without constraint as to whether the subset of glyphs are contiguous in the digital text content, and output the subset of glyphs as a single selection of the digital text content.

20 Claims, 12 Drawing Sheets

(56) References Cited

U.S. PATENT DOCUMENTS

| | | | | |
|---|---|---|---|---|
| 2004/0109183 | A1* | 6/2004 | Hawksworth | H04N 1/58 358/1.9 |
| 2004/0189653 | A1* | 9/2004 | Perry | G06T 11/203 345/557 |
| 2005/0198591 | A1* | 9/2005 | Jarrett | G06V 30/1423 382/187 |
| 2007/0109281 | A1* | 5/2007 | Simmons | G06F 3/03545 715/209 |
| 2008/0143740 | A1* | 6/2008 | Wilensky | G06T 11/60 345/619 |
| 2014/0047413 | A1* | 2/2014 | Sheive | G06F 8/33 717/110 |
| 2015/0082246 | A1* | 3/2015 | Tan | G06F 3/0488 715/823 |
| 2015/0121305 | A1* | 4/2015 | Saund | G06Q 10/107 715/810 |
| 2016/0274761 | A1* | 9/2016 | Alonso Ruiz | G06F 3/016 |
| 2019/0317980 | A1* | 10/2019 | Dhanuka | G06F 40/109 |
| 2019/0371009 | A1* | 12/2019 | Peterson | G06T 11/203 |
| 2020/0064985 | A1* | 2/2020 | Mannby | G06F 3/0488 |
| 2020/0117347 | A1* | 4/2020 | Voliter | G06T 11/40 |
| 2021/0089801 | A1* | 3/2021 | Durandet | G06F 3/04883 |
| 2021/0142479 | A1* | 5/2021 | Phogat | G06T 7/143 |

OTHER PUBLICATIONS

Lie; "An Effective Generic Lasso Selection Tool for Multiselection"; Jun. 2020; University of Bergen Department of Informatics (Year: 2020).*

"How can I make multiple non-contiguous text selections in Google Docs?", Stack Exchange Inc, Web Applications Forum [online][retrieved May 26, 2021]. Retrieved from the Internet <https://webapps.stackexchange.com/questions/97451/how-can-i-make-multiple-non-contiguous-text-selections-in-google-docs>., Aug. 11, 2016, 2 pages.

"Ray-casting algorithm", RosettaCode.org [online][retrieved May 26, 2021]. Retrieved from the Internet <https://rosettacode.org/wiki/Ray-casting_algorithm>., 89 pages.

Sederberg, T W. et al., "Curve Intersection Using Bezier Clipping", Computer-Aided Design, vol. 22, No. 9 [retrieved May 26, 2021]. Retrieved from the Internet <http://nishitalab.org/user/nis/cdrom/cad/CAGD90Curve.pdf>., Nov. 1990, pp. 538-549.

* cited by examiner

GLYPH SELECTION TOOL FOR DIGITAL TEXT CONTENT

BACKGROUND

Digital text selection is a critical aspect of digital content creation and editing. For instance, in order to change a visual appearance, such as a size, color, weight, style of typeface, and so forth, of glyphs (e.g., text characters), the glyphs must first be selected before the desired visual appearance can be affected. While a multitude of computer applications are designed to assist users in digital content creation and editing (e.g., for rendering in a user interface, as part of reproduction on a physical medium, and so forth), these applications are limited to conventional text selection approaches.

Conventional text selection approaches are restricted to enabling selection of only contiguous glyphs in live text, such as contiguous text characters in a word, contiguous words in a sentence, contiguous sentences in a paragraph, and so forth. Conventional text selection approaches are thus limited by a formatting of text content, and selection of non-continuous text elements requires precise selection of disparate text elements and formatting each text element separately. As a result, conventional text selection techniques are inefficient both with respect to user interaction involving manually selecting non-contiguous glyphs as well as inefficient consumption in computation resources to support this manual interaction.

SUMMARY

Glyph selection techniques are described for digital text content that enable selection of non-contiguous glyphs via input describing at least one path of any shape or form relative to the digital text content. In one example, a text selection system receives freeform drawing input defining a path and ascertains a selection scope for outputting a text selection relative to the path. The selection scope indicates whether the text selection is to include glyphs that intersect the path, glyphs displayed within an area enclosed by the path, glyphs displayed outside an area enclosed by the path, or combinations thereof.

The text selection system identifies a subset of glyphs of the digital text content for inclusion in the text selection by determining whether a glyph's bounding box is outside a bounding box of the path. The text selection system then considers only glyphs with bounding boxes inside the path bounding box and determines whether an individual glyph's outline intersects the path. Based on the selection scope, the text selection system optionally considers whether a glyph is displayed within an area enclosed by the path. In this manner, the text selection system is configured to enable selection of non-contiguous glyphs from the digital text content for inclusion in the subset of glyphs, which is output as a single selection of the digital text content.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
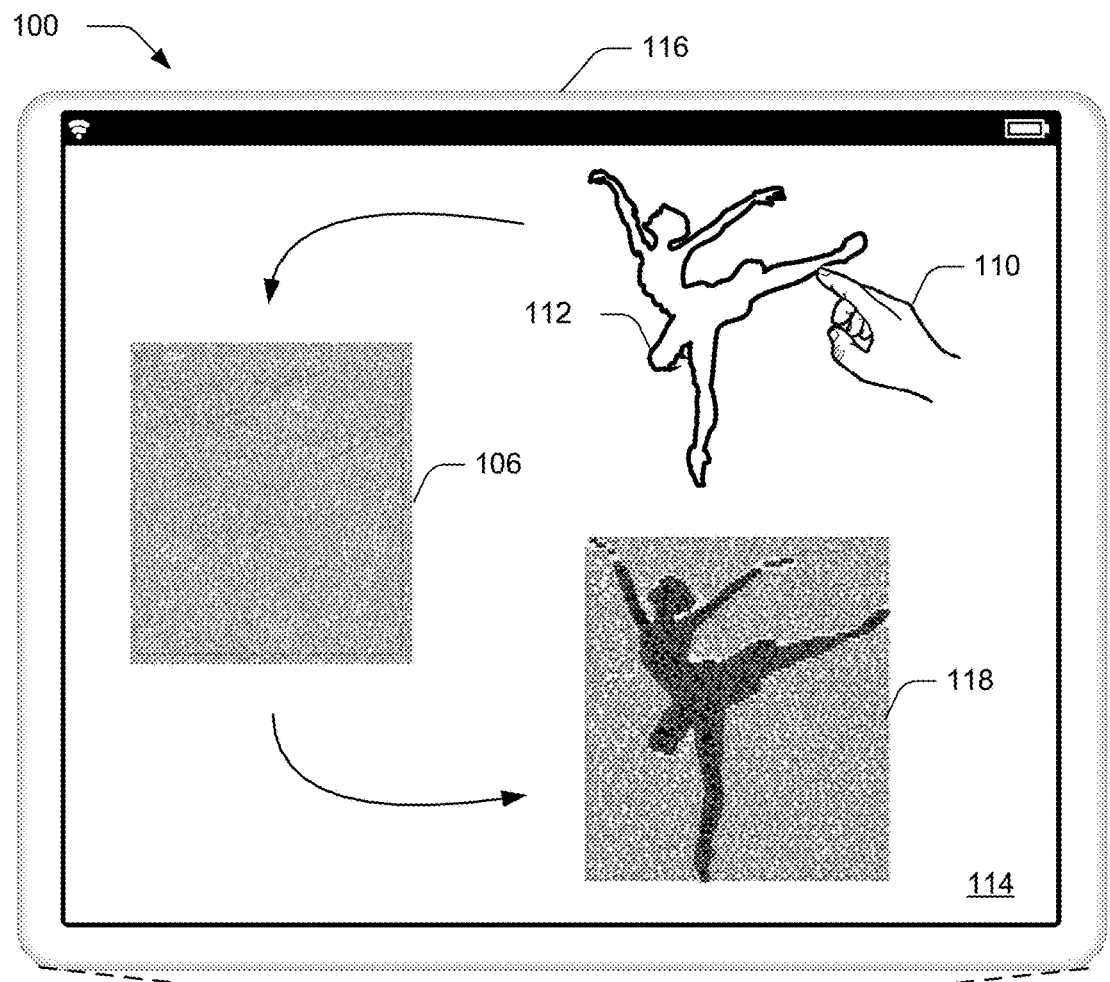
FIG. 1 is an illustration of a digital medium environment in an example implementation that is operable to employ glyph selection techniques described herein.
Figure 1:
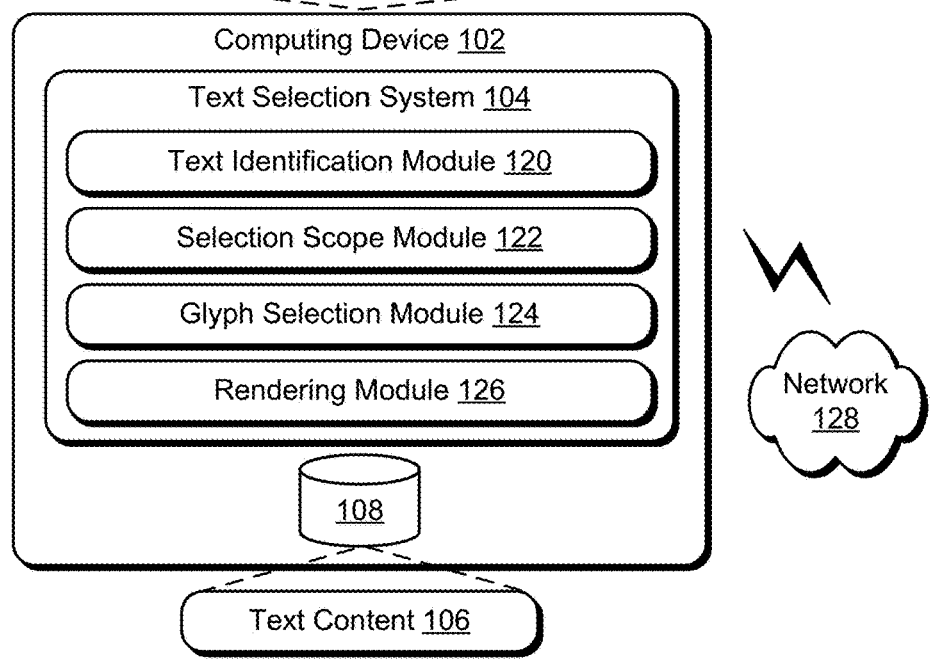

Conventional text selection techniques enable users to select a range of contiguous text characters from digital text content. Conventional text selection techniques involve controlling a cursor using a physical input device and/or inputting keyboard shortcuts. For instance, conventional text selection using a physical input device includes using a mouse to place a cursor relative to a specific word, sentence, or paragraph of text, clicking and holding a button of the cursor, and dragging the cursor to select a desired continuous range of text characters in the word, sentence, paragraph, and so forth.

Conventional text selection using a physical input device further includes double clicking a word to select text characters in the word, triple clicking a paragraph to select text characters in the paragraph, and so forth. Conventional text selection using keyboard shortcuts includes, for example, pressing "Ctrl+A" to select all text characters in an active document. Conventional text selection approaches further include combinations of mouse and keyboard inputs, such as placing a cursor relative to a word and pressing "Shift+down arrow" to select a line of text, pressing "Shift+up arrow" to select a paragraph of text, and so forth.

These conventional text selection approaches, however, are restricted by a format of the digital text content being selected and a type of computing device used to perform text selection. For instance, conventional text selection approaches only enable selection of contiguous text characters (e.g., sequential glyphs in a word, glyphs enclosed by a text box, glyphs arranged in contiguous cells of a table row or column, and so forth). Furthermore, conventional text selection approaches involving keyboard shortcuts do not conveniently extend to touchscreen input devices, where numerous inputs are required to initiate display of a keyboard on the touchscreen that visually occludes text content being selected, before keyboard shortcuts can be input.

Significantly, conventional text selection approaches do not enable a user to draw a freehand design or superimpose a closed path over digital text content to perform text selection. Consequently, digital content creators are forced to implement workarounds to achieve a desired text formatting effect by either repeatedly manually selecting individual portions of text intended to be included in a single text selection or converting (e.g., rasterizing) text to an image format and formatting the resulting image content. However, such workarounds fail to enable selecting live text characters (i.e., text characters that remain editable using word processing applications) that intersect with a user-defined path or are displayed relative to an area enclosed by the user-defined path, via a single input.

For instance, the conventional workaround of manually selecting individual portions of text requires tedious and time-consuming inputs to manually select glyphs that intersect a non-linear path or lie within a closed area and subsequently perform text editing and formatting operations. Each time a new formatting change needs to be performed, the manual selection of individual text portions must be repeated again. This conventional workaround is highly prone to user error (e.g., inadvertently omitting a glyph intended for selection) and quickly becomes unscalable when many glyphs are to be selected, unnecessarily consuming computing resources for each manual selection step.

The conventional workaround of converting text content to an image representation of the text content (e.g., by rasterizing or generating a bitmap image of the text content) is not truly a text selection tool because converting the text content to image content destroys the subsequent editability of glyphs by a word processing application. This workaround is merely used to apply image editing tools to achieve a desired visual appearance of text content otherwise applied post-selection of text characters (e.g., changing a color of a portion of glyphs depicted in the image). Thus, conventional text selection approaches are cumbersome, unintuitive, and inaccessible for many computing device types.

To address these issues, techniques for text selection using a freeform user-specified path are described herein. In one example, a text selection system receives input specifying a geometry that includes at least one path relative to digital text content displayed at a computing device. The text selection system identifies information specifying a display location of each glyph of the digital text content, a display location of the at least one path, and a selection scope for selecting glyphs relative to the at least one path. The selection scope is configurable to indicate selection of glyphs that intersect the at least one path, glyphs that are displayed within an area enclosed by the at least one path, glyphs that are displayed outside an area enclosed by the at least one path, or combinations thereof.

Based on the selection scope and the at least one path, the text selection system identifies and outputs glyphs of the digital text content as a single text selection. Advantageously, the single text selection is not restricted by a formatting of the digital text content, such that the single text selection is configurable to include non-contiguous glyphs from the digital text content. In outputting the single text selection, the text selection system first compares a bounding box of each glyph to a bounding box for the at least one path and filters glyphs based on the relative bounding box positions. By first considering bounding box information, the text selection system identifies glyphs that are definitively outside an enclosed area of, and not intersecting, the at least one path. Glyphs included in, or excluded from, the filtered subset are then optionally added to the single text selection according to a selection scope for generating the single text selection.

This initial filtering mitigates computations of correlations between curves describing a glyph outline and curves describing the at least one path, which are time-consuming and require increased computations relative to considering bounding box positions. After filtering glyphs according to bounding box positions, the text selection system determines, for each of the filtered glyphs, whether an outline of the glyph intersects the at least one path. Glyphs identified as intersecting the at least one path are excluded from the previously filtered subset of glyphs and optionally added to the text selection according to the selection scope. In some implementations, intersection between the at least one path and a glyph outline is performed using a Bezier clipping algorithm.

Optionally, based on the selection scope, the text selection system determines whether each glyph of the resulting filtered subset is disposed within an area enclosed by the at least one path. The text selection system is configured to identify whether a glyph is disposed within an area enclosed by the at least one path by casting rays from a center of a bounding box for the glyph and detecting intersections between each ray and the at least one path. Glyphs that satisfy a criteria of the selection scope are output by the text selection system as a single text selection (e.g., visually distinguished from non-selected glyphs of the digital text content as displayed in a user interface, added to a clipboard for further text editing operations, and so forth).

In this manner, the text selection system is configured to enable selection of even non-contiguous glyphs in digital text content based on a user-specified path, where the path is representative of any geometry, shape, or form. Further, by enabling a plurality of selection scopes for a single user-defined path, the text selection system enables convenient adjustment of glyphs included in a text selection without requiring a re-drawing of the path, thereby reducing a number of user inputs required to output a text selection. Advantageously, the text selection system is not limited to a formatting of the text content being selected, and the text selection techniques described herein are extendable to glyphs of all languages (e.g., Arabic, Japanese, Korean, etc.) and display configurations (e.g., columnized, displayed along a non-linear path, and so forth).

In contrast to conventional text selection approaches, the text selection techniques described herein enable output of a single text selection including non-contiguous glyphs without destroying a subsequent editability of the glyphs as otherwise caused by rasterization or conversion of text content to an image format. The text selection system is thus configured for implementation on a variety of computing device configurations, including computing devices supporting mouse-and-keyboard input devices, touchscreen input devices, combinations thereof, and so forth. Further discussion of these and other examples is included in the following sections and shown using corresponding figures.

Term Examples

A "glyph" is an elemental symbol within an agreed set of symbols (e.g., a font) to represent a readable character in typography. Examples of glyphs include letters, numbers, and other symbols, e.g., "@."

A "glyph outline" refers to one or more curves defining a visual appearance of a glyph as displayed as part of digital text content.

A "path" refers to one or more linked parametric curves, where each parametric curve is defined by a collection of control points $P_0$ through $P_n$, where "n" represents an order of the curve (e.g., n=1 for linear, n=2 for quadratic, and so forth).

A "bounding box" refers to an imaginary box that encloses a glyph or a path to define a display position of the corresponding glyph or path relative to a user interface. A bounding box is represented by four parameters relative to a display area of the user interface: a horizontal minimum value; a horizontal maximum value; a vertical minimum value; and a vertical maximum value.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated digital medium environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources (e.g., mobile devices). Additionally, although the computing device 102 is illustrated as a single computing device, the computing device 102 is also representative of a plurality of different devices, such as multiple servers utilized by a business to perform operations "over the cloud" as described in FIG. 12.

The computing device 102 is illustrated as including a text selection system 104. The text selection system 104 is implemented at least partially in hardware of the computing device 102 to enable selection of text content 106, which is illustrated as maintained in a storage device 108 of the computing device 102. The text content 106 includes text represented by a vector description configured to be edited via word processing applications (e.g., scalable text of TrueType fonts). In this manner, the text content 106 is contrasted with text represented by a raster or bitmap description, or text otherwise displayed as an image not configured to selection and editing via word processing applications.

Selection of the text content 106 is enabled responsive to receiving user input 110 that defines at least one path 112 relative to the text content 106 as displayed in a user interface 114, such as by a display device 116 of the computing device 102. Using the techniques described herein, the text selection system 104 is configured to enable selection of text for any type of geometry of the at least one path 112.

In this manner, the at least one path 112 is defined via freeform user input 110 to the user interface 114. Alternatively or additionally, the at least one path 112 is representative of a defined shape geometry, such as a rectangle, circle, triangle, and so forth. In some implementations, the at least one path 112 is defined by user input 110 selecting a pre-created geometry object (e.g., a logo). Because the at least one path 112 defined by user input 110 is not constrained or otherwise limited with respect to a resulting shape, geometry, or orientation of lines, the text selection system 104 advantageously enables selection of non-contiguous text content that is otherwise impossible using conventional text selection approaches.

The text selection system 104 identifies glyphs of the text content 106 relative to the at least one path 112 and outputs the identified glyphs as a text selection 118. In outputting the text selection 118, the text selection system 104 identifies glyphs that intersect the at least one path 112, are disposed within an enclosed area of the at least one path 112, are disposed outside an enclosed area of the at least one path 112, and combinations thereof. For instance, in the illustrated digital medium environment 100, user input 110 at the user interface 114 draws a path at least one path 112 in the shape of a ballerina over text content 106. The text selection system 104 determines that the scope of the text selection 118 is to include glyphs disposed within an enclosed area defined by the path at least one path 112 (e.g., glyphs disposed within the outline of the ballerina) and consequently selects glyphs of the text content 106 disposed within the at least one path 112 as defined by the user input 110.

In this manner, the text selection 118 is representative of a single selection range of glyphs, independent of whether the glyphs included in the single selection range are presented contiguously with one another in the text content 106. Notably, the text selection 118 is output independent of (i.e., without) converting the text content 106 to a raster image, bitmap image, or other type of data format that destroys the editability of individual glyphs of the text content 106. The text selection system 104 is configured to output the text selection 118 as a data array including glyphs of the text content 106 selected by the at least one path 112. Glyphs included in the text selection 118 are visually indicated as being selected (e.g., highlighted) in the user interface 114 and are configured to be simultaneously modified using one or more text editing tools (e.g., changing a font, size, color, etc. of the glyphs).

To output the text selection 118, the text selection system 104 employs a text identification module 120, a selection scope module 122, a glyph selection module 124, and a rendering module 126. The text identification module 120, the selection scope module 122, the glyph selection module 124, and the rendering module 126 are each implemented at least partially in hardware of the computing device 102. The text identification module 120 is configured to identify information describing a display of each glyph included in the text content 106 as output in the user interface 114. The selection scope module 122 is configured to identify a position of the at least one path 112 in the user interface 114 relative to the text content 106 as well as identify a scope for selecting glyphs to be included in the text selection 118 (e.g., glyphs on the path, glyphs inside the path, glyphs outside the path, or combinations thereof). The glyph selection module 124 is configured to select glyphs from the text content 106 based on the at least one path 112, the selection scope, and the glyph information identified by the text identification module 120, and the rendering module 126 is configured to display the text content 106, the at least one path 112, and the text selection 118 in the user interface. Further discussion of operations performed by the text identification module 120, the selection scope module 122, the glyph selection module 124, and the rendering module 126 is set forth below with respect to FIGS. 2-11.

Although illustrated as implemented locally at the computing device 102, functionality of the text selection system 104 is configurable as whole or in part via functionality available via the network 128, such as part of a web service or "in the cloud," as described in further detail below with respect to FIG. 12. Further discussion of these and other techniques is included in the following sections.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Automated Glyph Sizing Determination and Control

Figure 2:
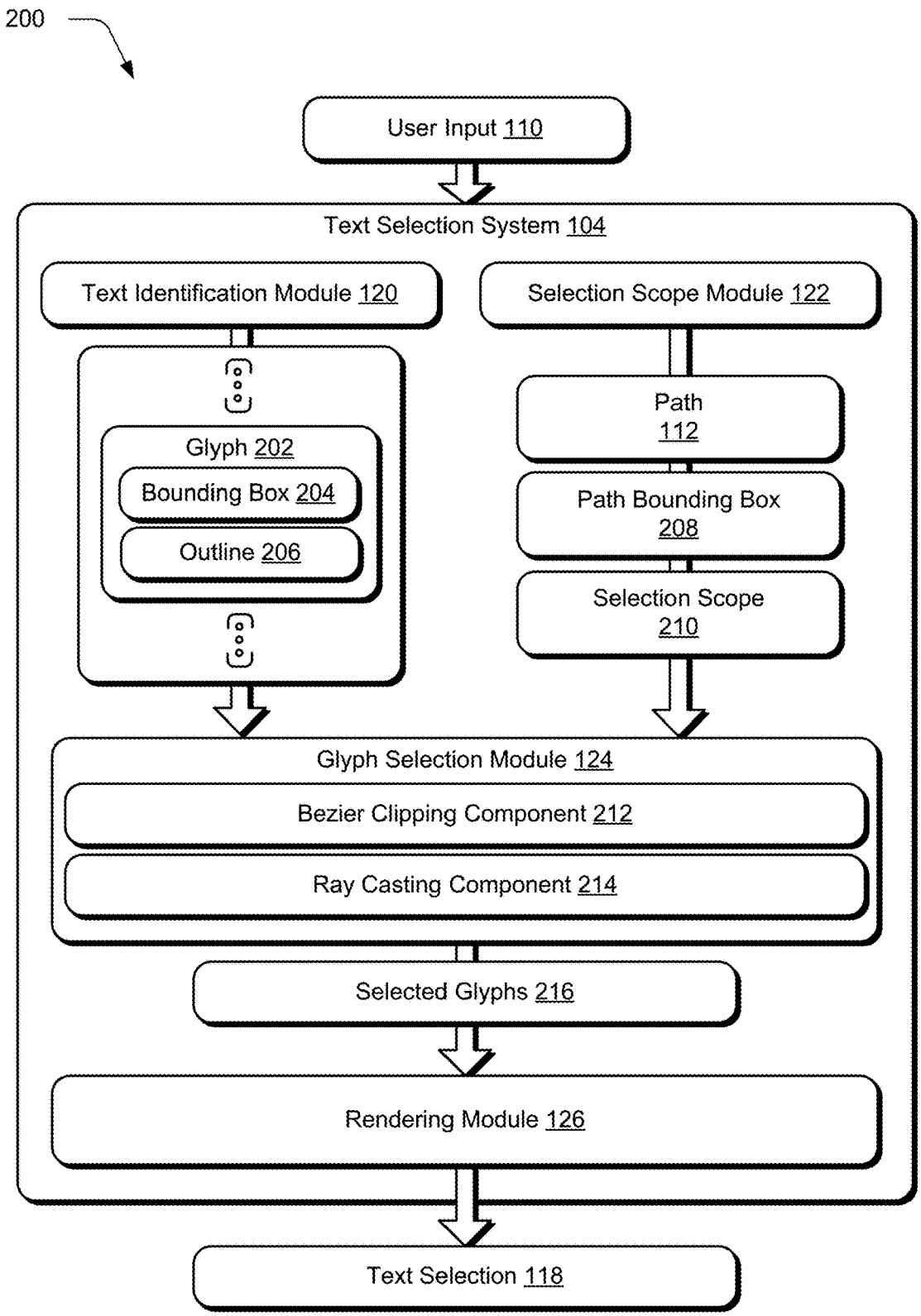
FIG. 2 depicts a system in an example implementation showing operation of a text selection system of FIG. 1 in greater detail.
Figure 3:
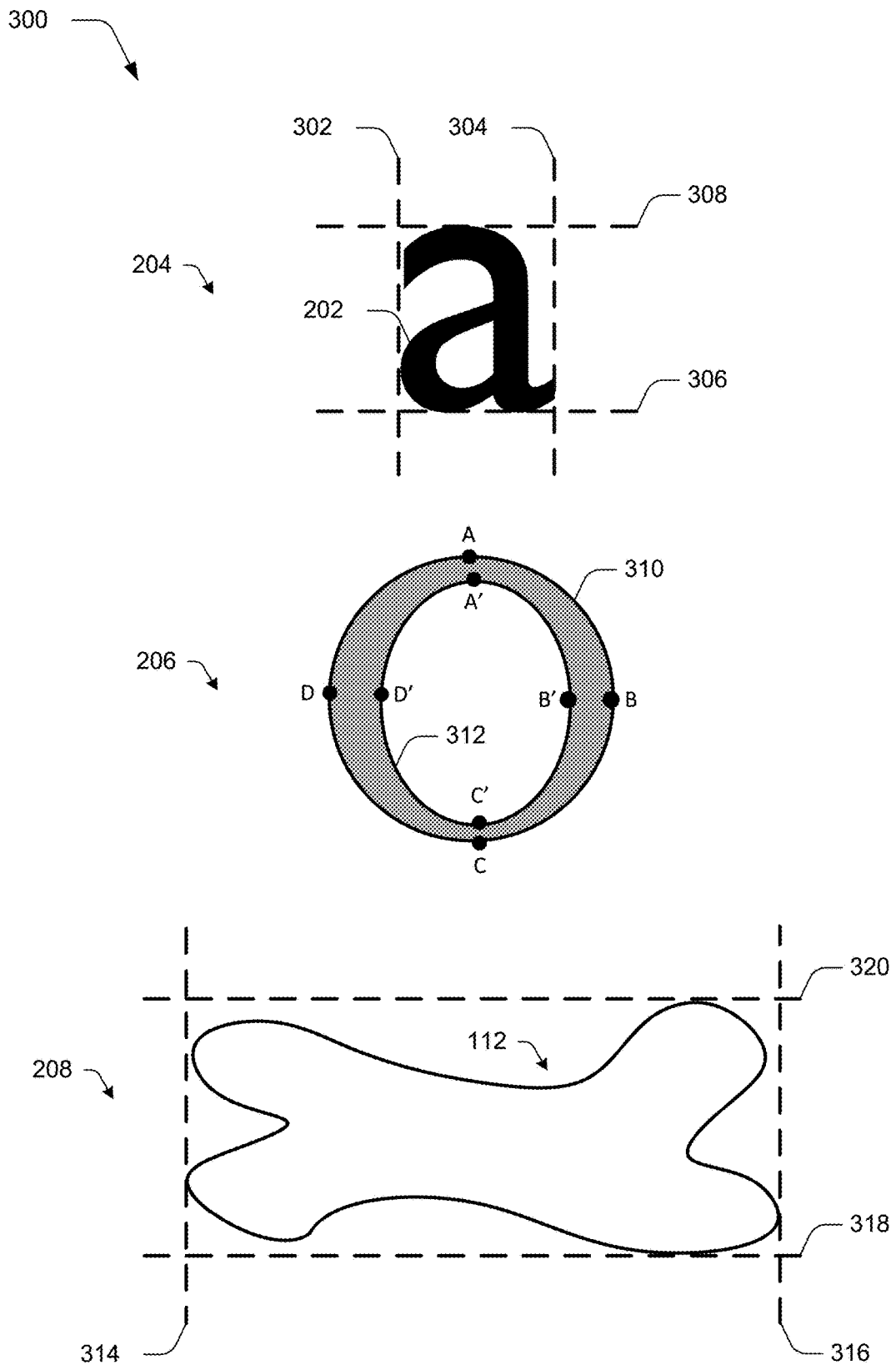
FIG. 3 depicts an example of path and glyph information considered by the text selection system of FIG. 1 for identifying glyphs to be output as part of a text selection.
Figure 4:
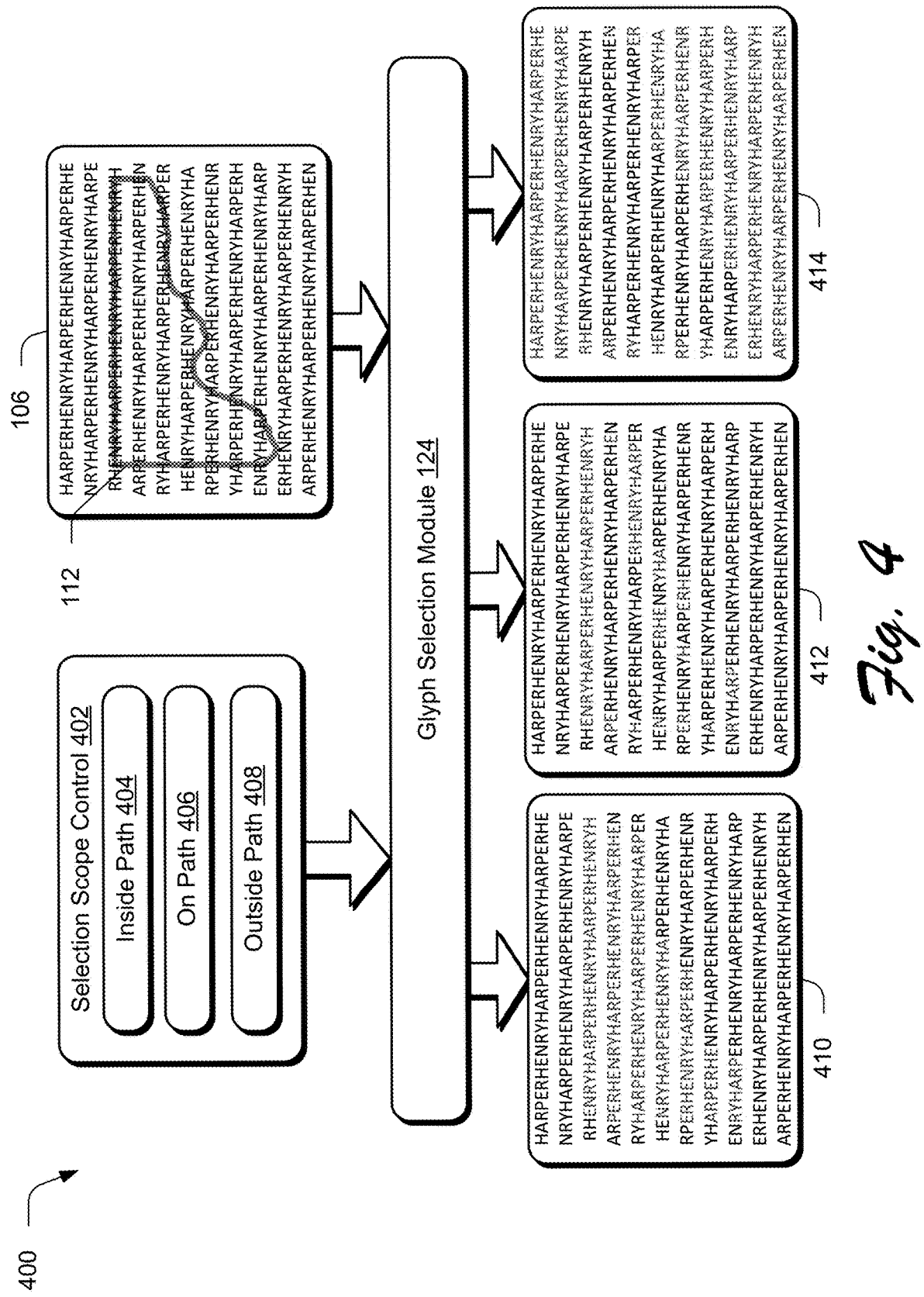
FIG. 4 depicts an example implementation of text selections output by the text selection system of FIG. 1.
Figure 5:
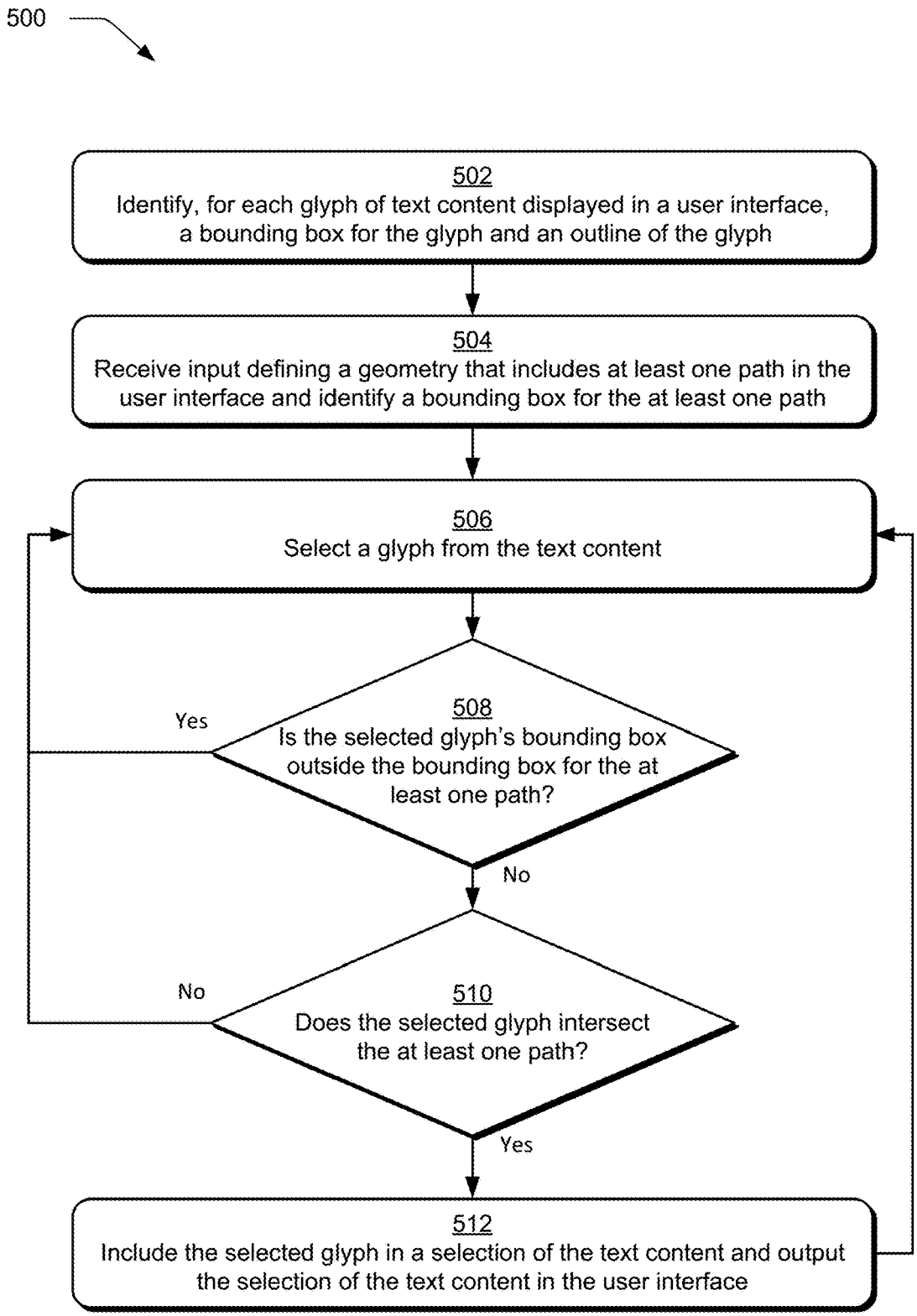
FIG. 5 is a flow diagram depicting a procedure in an example implementation of outputting a text selection that includes glyphs intersecting a path.
Figure 6:
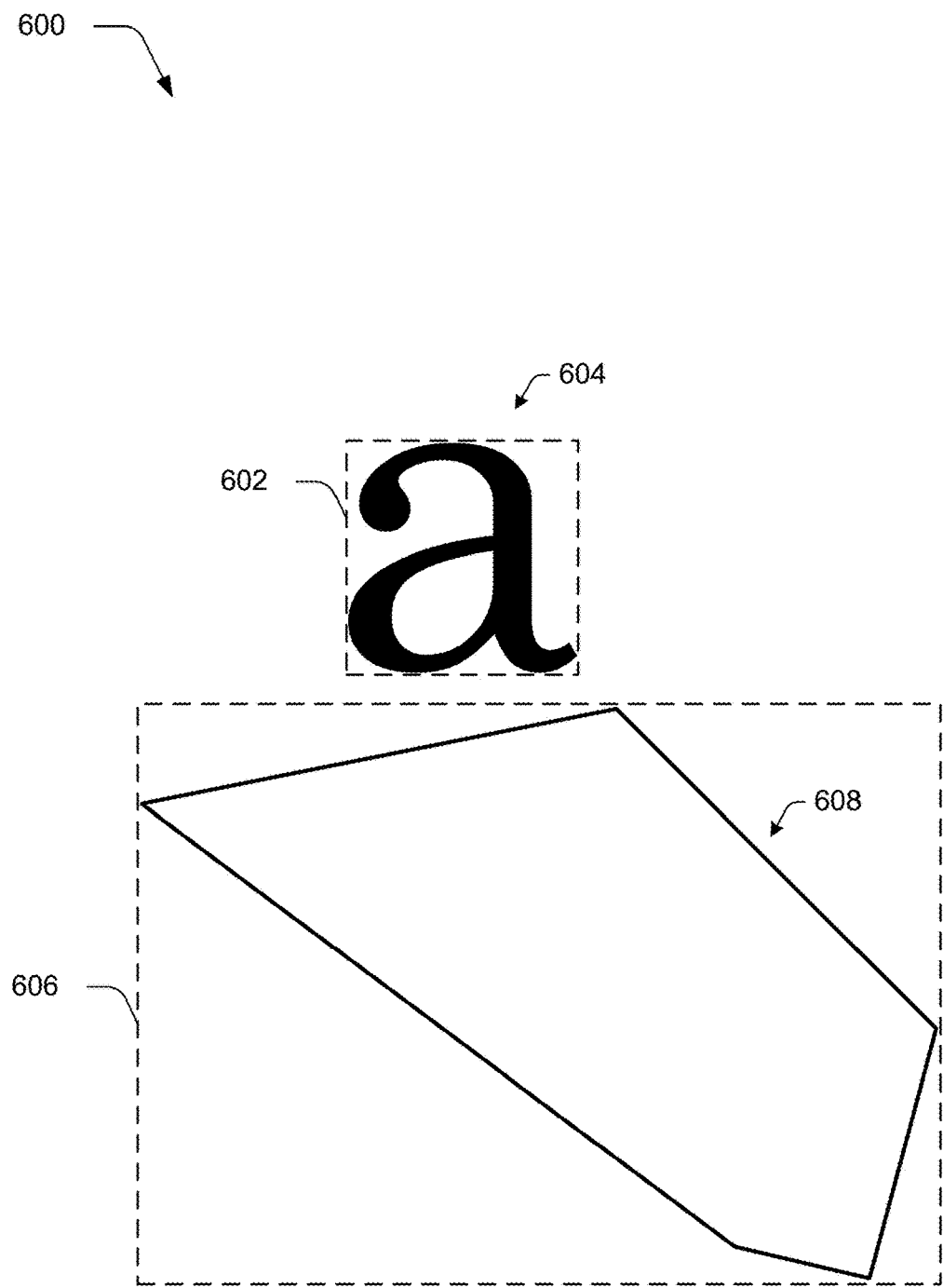
FIG. 6 depicts an example of path and glyph bounding boxes considered by the text selection system of FIG. 1 in outputting a text selection that includes glyphs.
Figure 7:
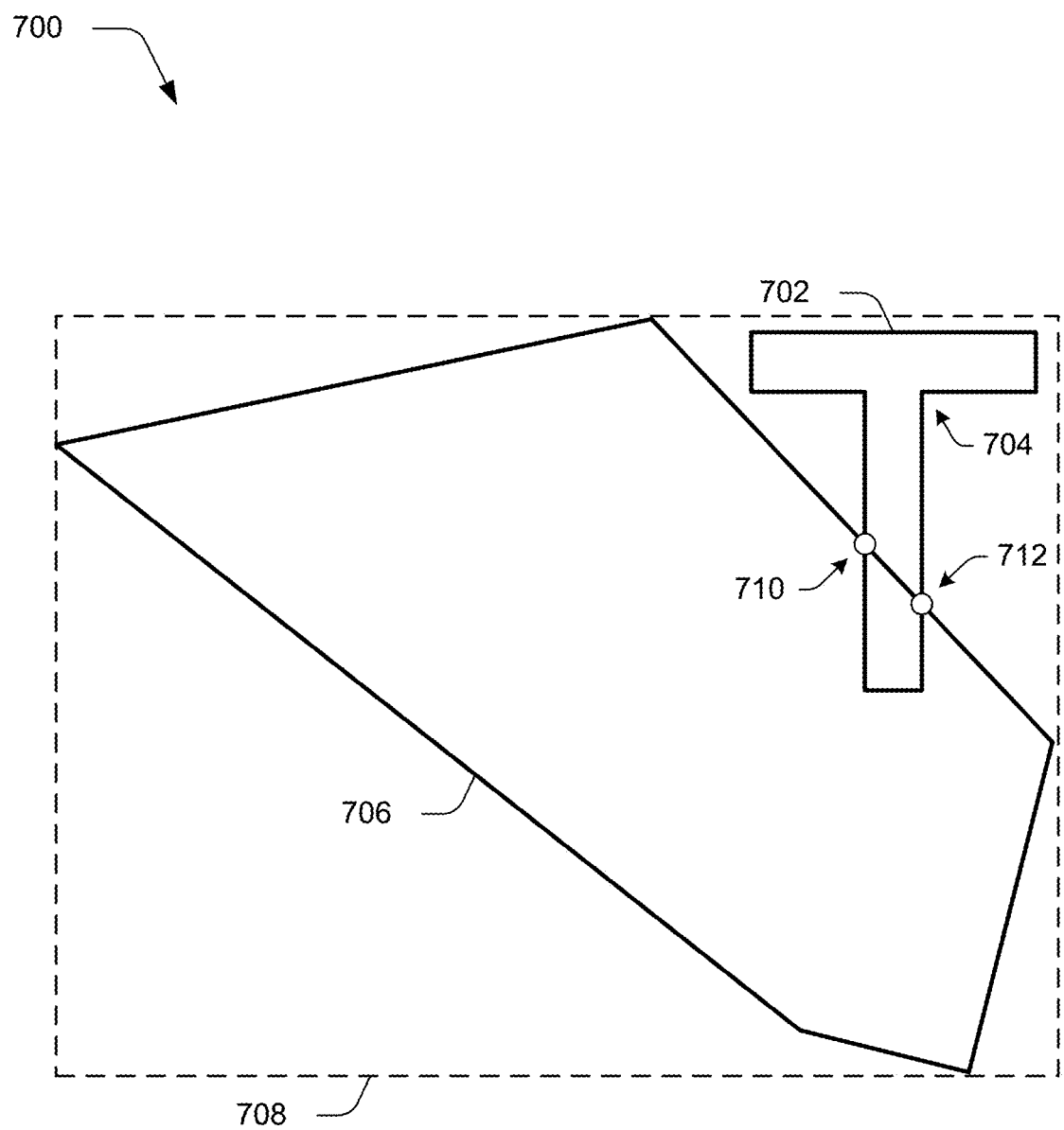
FIG. 7 depicts an example of implementation of the text selection system of FIG. 1 identifying an intersection between a path and a glyph.
Figure 8:
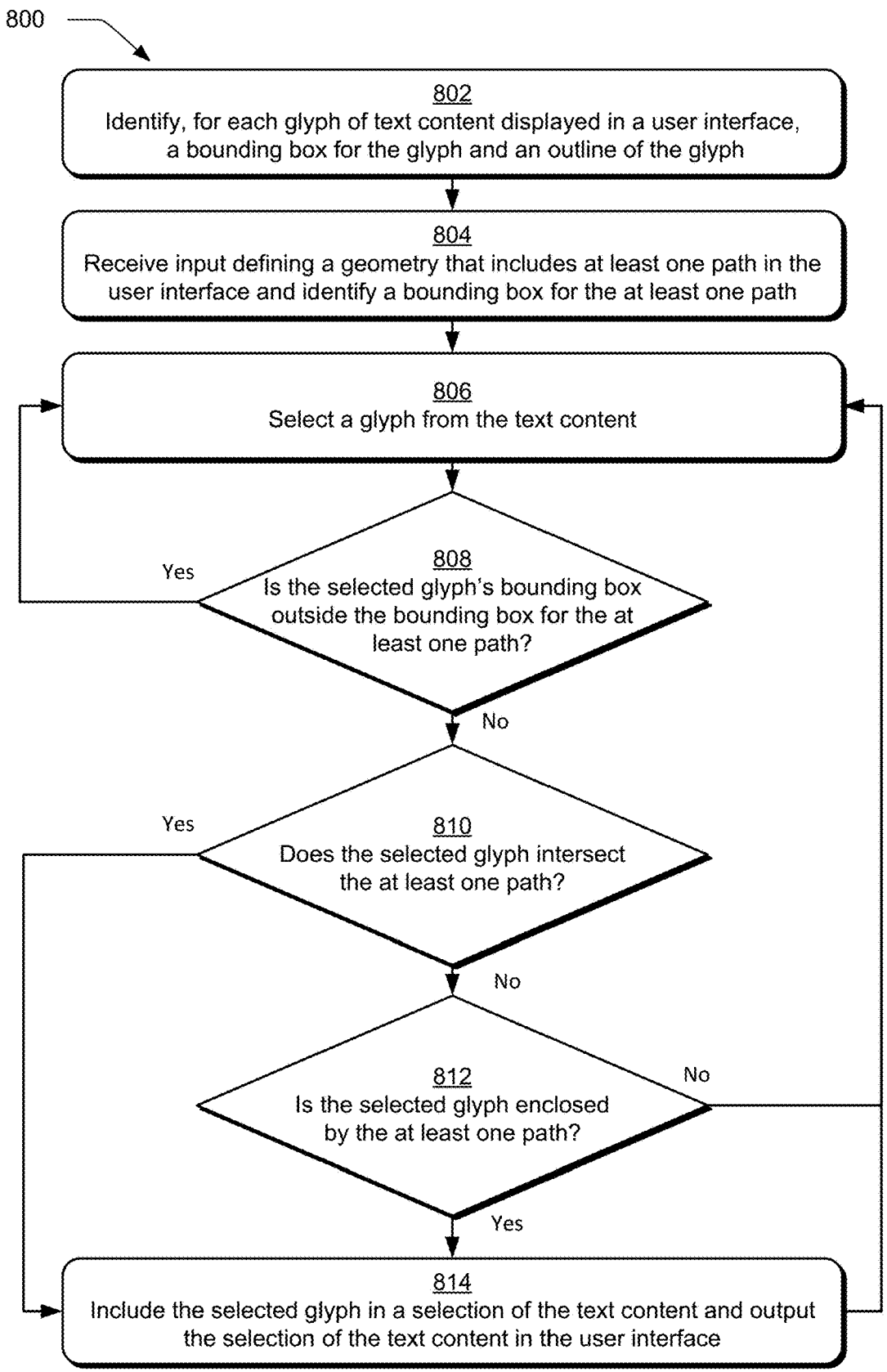
FIG. 8 is a flow diagram depicting a procedure in an example implementation of outputting a text selection that includes glyphs identified relative to a path.
Figure 9:
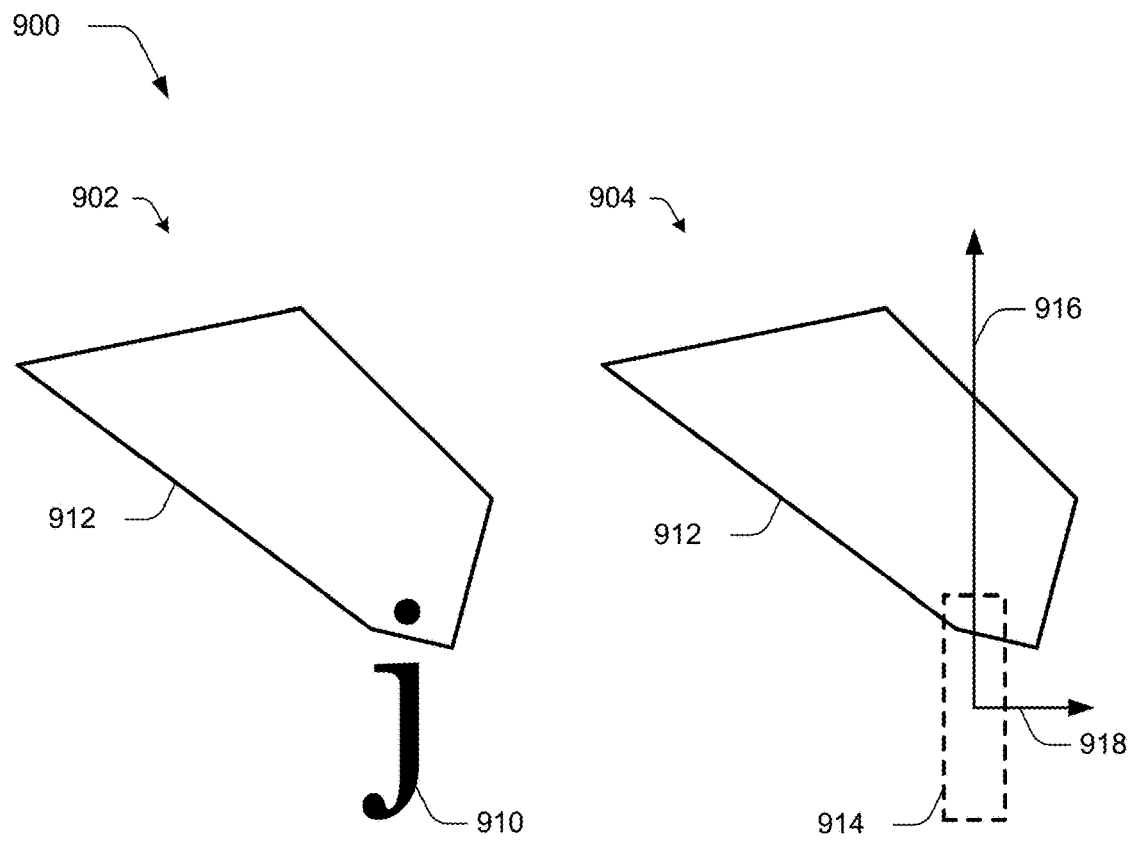
FIG. 9 depicts an example implementation of the text selection system of FIG. 1 determining whether a glyph is enclosed by a path.
Figure 9:
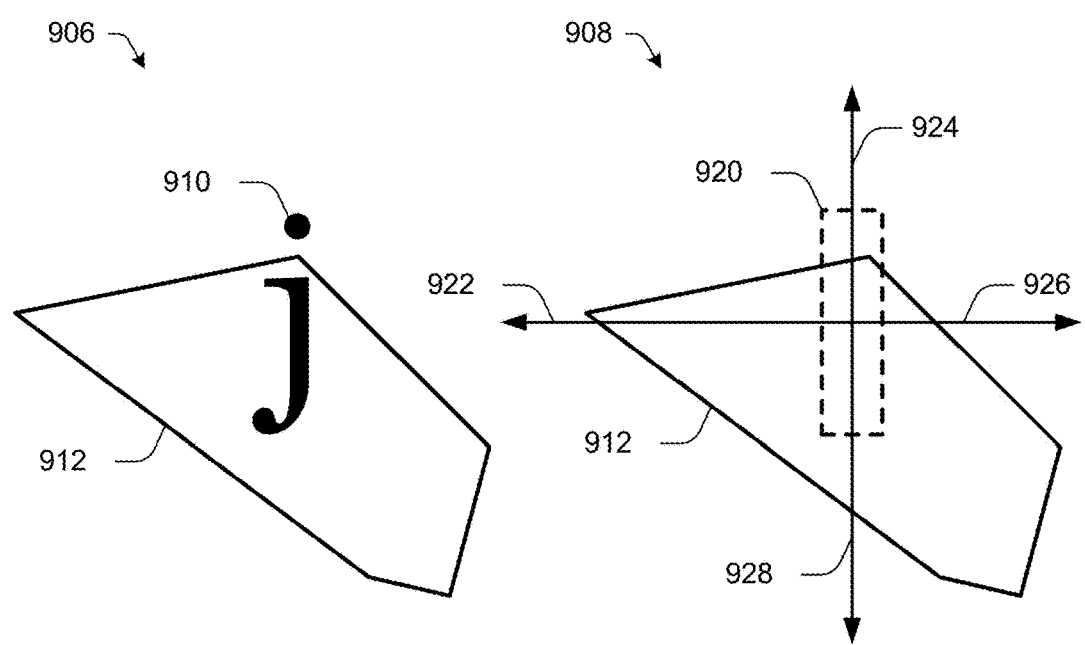

FIG. 2 depicts a system 200 in an example implementation showing operation of the text selection system 104 of FIG. 1 in greater detail. FIG. 3 depicts an example 300 of information used by the glyph selection module 124 to select glyphs for inclusion in the text selection 118. FIG. 4 depicts an example 400 of different text selections output for a path based on various selection scopes. FIG. 5 depicts a procedure 500 in an example implementation of the text selection system 104 of FIG. 1 generating a text selection that includes glyphs disposed on a path. FIG. 6 depicts an example 600 of information identified by the selection scope module 122 used to output the text selection 118. FIG. 7 depicts an example 700 of identifying an intersection between a path and a glyph using Bezier clipping. FIG. 8 depicts a procedure 800 in an example implementation of the text selection system 104 of FIG. 1 outputting a text selection 118 that includes glyphs identified relative to a path. FIG. 9 depicts an example 900 of the text selection system 104 of FIG. 1 determining whether a glyph is enclosed by a path using ray casting.

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-11.

To begin in this example, digital text content is displayed at a user interface of a computing device implementing the text selection system 104, such as the display device 116 of the computing device 102 as illustrated in FIG. 1. The text content 106 represents live text glyphs configured for editing via a word processing application when included as part of a text selection 118, in contrast to rasterized digital content depicting text or digital content including text formatted as an image (e.g., bitmap). The text identification module 120 identifies, for each glyph 202 of the text content, a bounding box 204 for the glyph and an outline 206 of the glyph (blocks 502 and 802). The text selection system 104 receives user input 110 defining a geometry that includes at least one path 112 in the user interface relative to the text content and the selection scope module 122 identifies a path bounding box 208 for the at least one path 112 (blocks 504 and 804).

FIG. 3 illustrates an example 300 depicting an example bounding box 204 for a glyph 202, an example glyph outline 206, and an example path bounding box 208. As described herein, a bounding box 204 for a glyph 202 refers to an imaginary box that encloses the glyph 202. In the illustrated example of FIG. 3, the bounding box 204 for an "a" glyph 202 is represented by four parameters: a horizontal minimum value 302; a horizontal maximum value 304; a vertical minimum value 306; and a vertical maximum value 308. A difference between the horizontal maximum value 304 and the horizontal minimum value thus represents a span of a horizontal dimension of the glyph 202 as displayed in the user interface 114. Likewise, a difference between the vertical maximum value 308 and the vertical minimum value 306 represents a span of a vertical dimension of the glyph 202 as displayed in the user interface 114.

The four parameters used to define a bounding box 204 for a glyph 202 are identified by the text identification module 120 based on the outline 206 for the glyph 202. Each glyph 202 is uniquely identified by a glyph identifier and output for display in the user interface 114 stylized in the text content 106 according to one or more fonts. For an individual glyph 202, the text identification module 120 is configured to identify the glyph identifier and corresponding font to identify Bezier paths or composite Bezier curves defining the outline 206 of the glyph 202. For instance, the example outline 206 illustrated in FIG. 3 depicts an example of an "O" glyph defined by the two closed paths, 310 and 312, where path 310 is represented by ABCD and path 312 is represented by A'B'C'D'.

In implementations, information describing the Bezier paths or composite Bezier curves for a particular glyph identifier and font pair is retrieved by the text identification module 120 from the storage device 108. Alternatively or additionally, the text identification module 120 is configured to retrieve information describing the outline 206 for a glyph 202 from one or more sources implemented remotely from a computing device implementing the text selection system 104, such as from a different computing device via network 128. In addition to describing Bezier paths or composite Bezier curves for a glyph 202, the outline 206 output by the text identification module 120 is representative of information specifying a position of the glyph 202 as displayed in the user interface 114.

Similar to the bounding box 204 for a glyph 202, the path bounding box 208 for a path 112 is represented by four parameters. As depicted in FIG. 3, the four parameters for the example path bounding box 208 include a horizontal minimum value 314, a horizontal maximum value 316, a vertical minimum value 318, and a vertical maximum value 320. A difference between the horizontal maximum value 316 and the horizontal minimum value 314 thus represents a span of a horizontal dimension of the path 112 as displayed in the user interface 114. A difference between the vertical maximum value 320 and the vertical minimum value 318 consequently represents a span of a vertical dimension of the path 112 as displayed in the user interface 114.

The path 112 is represented in the form of one or more Bezier paths or composite Bezier curves by the selection scope module 122 based on the geometry specified by the user input 110 (e.g., a freeform drawn path, specification of a defined shape, selection of a pre-designed vector object, and so forth). In addition to including information describing one or more Bezier paths or composite Bezier curves, the selection scope module 122 outputs the path 112 as including information describing a display location of the path 112 as disposed by the user input 110 in the user interface 114.

In addition to generating information describing the path 112 and the path bounding box 208, the selection scope module 122 is configured to ascertain a selection scope 210 for generating the text selection 118 relative to the path 112. In some implementations, the selection scope module 122 ascertains the selection scope 210 based on user input received at a user interface of the text selection system 104. For instance, prior and/or responsive to receiving the user input 110 defining the path 112 for generating the text selection 118, the text selection system 104 is configured to prompt a user of the computing device 102 to specify the selection scope according to one or a combination of three options: select glyphs on the path 112, select glyphs inside the path 112, or select glyphs outside the path 112.

FIG. 4 illustrates an example 400 of different text selections output for a path based on various selection scopes. For instance, the example 400 depicts a selection scope control 402, which includes selectable options 404, 406, and 408. Selectable option 404 enables designating glyphs of the text content 106 displayed within an enclosed area of the path 112 for inclusion in the text selection 118. In some implementations, the selection scope control 402 is displayed responsive to receiving input at a tool of a word processing application running on a computing device implementing the text selection system 104 (e.g., responsive to detecting selection of a "lasso for text" tool offered as native functionality of a word processing application). Selectable option 406 enables designating glyphs of the text content 106 displayed as being intersected by the path 112 for inclusion in the text selection 118. Selectable option 408 enables designating glyphs of the text content 106 displayed outside an enclosed area of the path 112 for inclusion in the text selection 118. In this manner, various combinations of the selectable options 404, 406, and 408 are useable to define the selection scope 210, which affects which glyphs of the text content 106 are selected for output as part of the text selection 118.

Consequently, the selection scope 210 represents one of six options. A first option for the selection scope 210 designates selection of only glyphs of the text content 106 inside an area enclosed by the path 112 for inclusion in the text selection 118, excluding glyphs intersecting the path 112 or displayed outside an enclosed by the path 112. An example of a resulting text selection for this first selection scope option is illustrated by the example selected glyphs 410. A second option for the selection scope 210 designates selection of only glyphs of the text content 106 intersecting the path 112, excluding glyphs with outlines 206 that do not intersect the path 112. An example of a resulting text selection for this second selection scope option is illustrated by the example selected glyphs 412. A third option for the selection scope 210 designates selection of only glyphs of the text content 106 displayed outside an area enclosed by the path 112 for inclusion in the text selection 118, excluding glyphs intersecting the path 112 or displayed within an area enclosed by the path 112. An example of a resulting text selection for this third selection scope option is illustrated by the example selected glyphs 414.

A fourth option for the selection scope 210 designates selection of glyphs intersecting the path 112 and inside an area enclosed by the path 112 for inclusion in the text selection 118, excluding glyphs displayed outside an area enclosed by the path 112 with outlines that do not intersect the path 112. A fifth option for the selection scope 210 designates selection of glyphs intersecting the path 112 and displayed outside an area enclosed by the path 112 for inclusion in the text selection 118, excluding glyphs displayed inside an area enclosed by the path 112 with outlines that do not intersect the path 112. A sixth option for the selection scope 210 designates selection of glyphs displayed inside and outside an area enclosed by the path 112, excluding glyphs having outlines that intersect the path 112.

In some implementations, the text selection system 104 is configured to automatically select selectable option 406 responsive to receiving input selecting selectable option 404, such that the default for a selection scope 210 designating glyphs "inside" the path 112 for inclusion in the text selection 118 also includes glyphs that intersect the path 112. Alternatively or additionally, default options for the selection scope 210 are modifiable by a user of the text selection system 104.

In some implementations, the text selection system 104 is configured to output the selection scope control 402 in the user interface 114 together with the text selection 118 and update glyphs included in the text selection 118 in real-time based on input to the selection scope control 402. For instance, upon receiving input to the selection scope control 402 indicating that glyphs disposed outside the path 112 are to be included in the text selection 118 during display of a text selection 118 that includes glyphs disposed inside the path 112, the text selection system 104 is configured to invert the text selection 118. In this manner, the text selection system 104 enables a user to easily manipulate a selection scope 210 for a path 112 without having to re-draw or otherwise provide new user input 110 defining the path 112.

Responsive to identifying the selection scope 210 for selecting glyphs of the text content 106 for inclusion in the text selection 118 relative to the path 112, the selection scope module 122 communicates information describing the path 112, the path bounding box 208, and the selection scope 210 to the glyph selection module 124. The glyph selection module 124 is further configured to receive information from the text identification module 120 describing a bounding box 204 and an outline 206 for each glyph 202 included in the text content 106. Given this information, the glyph selection module 124 selects glyphs from the text content 106 according to the selection scope 210.

Responsive to the selection scope 210 indicating that the text selection 118 is to include only glyphs of the text content 106 intersecting the path 112, or responsive to determining that the path 112 does not create an enclosed area, the glyph selection module 124 selects glyphs using a Bezier clipping component 212 according to the flow of FIG. 5. Alternatively, responsive to the selection scope 210 indicating that the text selection 118 is to include glyphs of the text content 106 relative to an enclosed area created by the path 112, the glyph selection module 124 selects glyphs using the Bezier clipping component 212 in combination with a ray casting component 214 according to operations included in the flow of FIG. 8.

For instance, responsive to determining that the selection scope 210 indicates that only glyphs of the text content 106 intersecting the path 112 are to be included in the text selection 118 or determining that the path 112 does not create an enclosed area, the glyph selection module 124 processes each glyph of the text content 106 according to the flow of FIG. 5. To begin, the glyph selection module 124 selects a glyph 202 from the text content 106 (block 506). The glyph selection module 124 then determines whether the selected glyph's bounding box 204 is positioned outside the path bounding box 208 (block 508). If the selected glyph's bounding box 204 is positioned outside the path bounding box 208, the selected glyph is excluded from the text selection 118 and operation returns to block 506 to select a different glyph from the text content 106. In some implementations, the glyph selection module 124 repeats operation of block 508 for each glyph in the text content 106 to generate a filtered subset of glyphs before proceeding to operation of block 510, as described in further detail below.

As illustrated in the example 600 of FIG. 6, the outline 206 of a glyph 202 cannot intersect the path 112 if the bounding box 204 for the glyph 202 is positioned outside the path bounding box 208. For instance, the example 600 depicts a bounding box 602 for a glyph 604 positioned outside a path bounding box 606 for a path 608. By first comparing the bounding box 602 of the glyph 604 with the path bounding box 606, the glyph selection module 124 is configured to filter out, or exclude, glyphs from inclusion in the text selection 118 for a selection scope indicating that only glyphs intersecting the path 608 are to be included in the text selection 118.

This selective filtration avoids unnecessarily comparing an outline of the glyph 604 to the path 608 for instances where it is impossible for the glyph 604 to intersect the path 608. The relative positioning of a bounding box 204 for a glyph 202 relative to a path bounding box 208 can be readily determined using the horizontal minimum values, horizontal maximum values, the vertical minimum values, and the vertical maximum values for the bounding box 204 and the path bounding box 208, with significantly fewer computations than determining whether the outline 206 for the glyph 202 intersects the path 112. Consequently, this selective filtering of glyphs based on respective bounding box positions optimally reduces an amount of computing resources required by the text selection system 104 to output the text selection 118.

In response to determining that the selected glyph's bounding box 204 is positioned inside the path bounding box 208, operation of the glyph selection module 124 proceeds to determine whether the selected glyph intersects the path 112 (block 510). FIG. 7 depicts an example 700 of an outline 702 of a glyph 704 intersecting a path 706. The glyph 704 and the path 706 are processed by the component 212 of the glyph selection module 124 responsive to determining that a bounding box (not depicted) for the glyph 704 is not positioned outside a bounding box 708 for the path 706.

To identify intersections, the component 212 implements a known Bezier clipping algorithm configured to identify whether the outline 206 of a glyph 202 intersects the path 112. With respect to the example 700, when provided with the outline 702 of the glyph 704 and the path 706 as input, the Bezier clipping component 212 identifies intersection points 710 and 712 between the outline 702 and the path 706. Alternatively or additionally to implementing a Bezier clipping algorithm, the component 212 is configured to identify an intersection between a glyph outline 206 and a path 112 using a Sylvester matrix.

Responsive to determining that the selected glyph does not intersect the path 112, operation returns to block 506 to select a different glyph from the text content 106. Alternatively, responsive to determining that the outline 206 of the selected glyph intersects the path 112, the selected glyph is included in the selected glyphs 216 and output as part of the text selection 118 in the user interface 114 (block 512). Operation then returns to block 506 to select a different glyph from the text content 106, with the glyph selection module 124 performing the operations represented by blocks 506, 508, 510, and 512 until all glyphs of the text content 106 have been processed.

Alternatively, responsive to determining that the selection scope 210 indicates that the text selection 118 is to include glyphs of the text content 106 relative to an enclosed area created by the path 112, the glyph selection module 124 selects glyphs using the Bezier clipping component 212 in combination with a ray casting component 214 according to operations included in the flow of FIG. 8. Although the flow of FIG. 8 is tailored for an example selection scope 210 indicating that glyphs intersecting the path 112 and glyphs disposed within an area enclosed by the path 112 are to be included in the text selection 118, the operations set forth in FIG. 8 are useable by the glyph selection module 124 to output selected glyphs 216 for any selection scope 210 relative to an area enclosed by the path 112.

To begin, the glyph selection module 124 selects a glyph 202 from the text content 106 (block 806). The glyph selection module 124 then determines whether the selected glyph's bounding box 204 is positioned outside the path bounding box 208 (block 808). If the selected glyph's bounding box 204 is positioned outside the path bounding box 208, the selected glyph is excluded from the text selection 118 and operation returns to block 806 to select a different glyph from the text content 106. In some implementations, the glyph selection module 124 repeats operation of block 808 for each glyph in the text content 106 to generate a filtered subset of glyphs before proceeding to operation of block 810, as described in further detail below.

In response to determining that the selected glyph's bounding box 204 is positioned inside the path bounding box 208, the glyph selection module 124 proceeds to determine whether the selected glyph intersects the path 112 (block 810). Determining whether the selected glyph intersects the path 112 is performed by the Bezier clipping component 212 of the glyph selection module 124, as described above. Responsive to determining that the outline 206 of the selected glyph intersects the path 112, the selected glyph is included in the selected glyphs 216 and output as part of the text selection 118.

Alternatively, responsive to determining that the selected glyph does not intersect the path 112, the glyph selection module 124 proceeds to determine whether the selected glyph is displayed within an area enclosed by the path 112 (block 812). Responsive to determining that the selected glyph is not displayed within an area enclosed by the path 112, operation returns to block 806 to select a different glyph from the text content 106. Alternatively, responsive to determining that the selected glyph is displayed within an area enclosed by the path 112, the selected glyph is included in the selected glyphs 216 and output as part of the text selection 118 in the user interface 114 (block 814). Operation then returns to block 806 to select a different glyph from the text content 106, with the glyph selection module 124 performing the operations represented by blocks 806, 808, 810, 812, and 814 until all glyphs of the text content 106 have been processed.

In order to determine whether the selected glyph is displayed within an area enclosed by the path 112, the glyph selection module 124 implements a ray casting component 214 configured to identify, given a point and an enclosed region, whether the point is inside or outside the enclosed region. Operation of the ray casting component 214 is illustrated with respect to FIG. 9.

FIG. 9 depicts an example 900 of the ray casting component 214 determining whether a glyph 202 is displayed within an area enclosed by the path 112 (e.g., a shape created by the path) using ray casting. Specifically, FIG. 9 depicts an example 902 of a glyph with a bounding box center disposed outside an area enclosed by a path, an example 904 of determining that the glyph of example 902 is disposed outside the enclosed area using ray casting, an example 906 of a glyph with a bounding box center disposed inside a path's enclosed area, and an example 908 of determining that the glyph of example 906 is disposed inside the path's enclosed area using ray casting.

In example 902, glyph 910 is displayed relative to a path 912. Example 902 represents a situation where the outline of the glyph 910 does not intersect the path 912, but also is not positioned entirely outside an area enclosed by the path 912 nor positioned entirely inside the area enclosed by the path 912. To account for such situations the ray casting component 214 is configured to determine a relative position of a glyph 202 to an area enclosed by a path 112 using a center point of the bounding box 204 for the glyph 202. For instance, example 904 depicts a bounding box 914 for the glyph 910.

To determine whether the glyph 910 is displayed within the area enclosed by path 912, the ray casting component 214 casts at least one ray, such as example rays 916 and 918, extending infinitely from a center of the bounding box 914 and determines a number of intersections between the at least one ray and the perimeter of the area enclosed by the path 912. In response to determining that the number of detected intersections for each ray is even (e.g., two intersections between ray 916 and the perimeter of the area enclosed by path 912 and zero intersections between ray 918 and path 912), the ray casting component 214 determines that the glyph 910 is not enclosed by the path 912. In contrast, detecting an odd number of intersections for each ray causes the ray casting component to determine that a glyph is enclosed by a path.

For instance, example 906 depicts glyph 910 repositioned relative to the path 912. To determine whether the glyph 910 is positioned within an area enclosed by the path 912, the ray casting component 214 identifies a bounding box 920 for the glyph 910 as positioned in the example 906. The ray casting component 214 casts at least one ray, such as example rays 922, 924, 926, and 928, extending from a center of the bounding box 920 and determines a number of intersections between the at least one ray and the perimeter of the area enclosed by the path 912. In response to determining that the number of detected intersections for each ray is odd (e.g., one intersection between the path 912 and each of the rays 922, 924, 926, and 928), the ray casting component 214 determines that the glyph 910 is enclosed by the path 912.

Although described with respect to casting rays from a center of a bounding box 204 for a selected glyph 202, the ray casting component 214 is configured to determine a relative location of the selected glyph 202 to an area enclosed by the path 112 using any suitable point in the bounding box 204 for the selected glyph 202.

In this manner, although illustrated and described above in the context of a selection scope 210 that specifies selecting glyphs that intersect the path 112 and selecting glyphs displayed within an area enclosed by the path 112, the operations of FIG. 8 are useable by the text selection system 104 to output selected glyphs 216 for any selection scope 210 relative to an area enclosed by the path 112. For instance, in an implementation where the selection scope 210 specifies that the text selection 118 is to include glyphs positioned outside an area enclosed by the path 112, the glyph selection module 124 causes the selected glyph to be included in the text selection 118 responsive to a yes determination at block 808. In an implementation where the selection scope 210 specifies that the text selection 118 is to exclude glyphs intersecting the path 112, the glyph selection module 124 causes the selected glyph to be excluded from the text selection 118 responsive to a yes determination at block 810. In an implementation where the selection scope 210 specifies that the text selection 118 is to exclude glyphs displayed within an area enclosed by the path 112, the glyph selection module 124 causes the selected glyph to be excluded from the text selection 118 responsive to a yes determination at block 812.

The selected glyphs 216 identified by the glyph selection module 124 according to the selection scope 210 are then provided to the rendering module 126 for output as the text selection 118. The rendering module 126 is configured to visually distinguish the selected glyphs 216 from other glyphs of the text content 106, such that a user of the text selection system 104 is readily informed as to a selection resulting from the path 112 and selection scope 210. In some implementations the glyph selection module 124 is further configured to add the selected glyphs 216 to a clipboard stored in the storage device 108 of the computing device 102 for subsequent text editing operations (e.g., pasting the selected glyphs 216 to different text content). In this manner, the text selection system 104 is configured to enable selection of glyphs from text content 106 according to a user-defined path, without constraint regarding a geometry of the path or a formatting of the text content 106.

Figure 10:
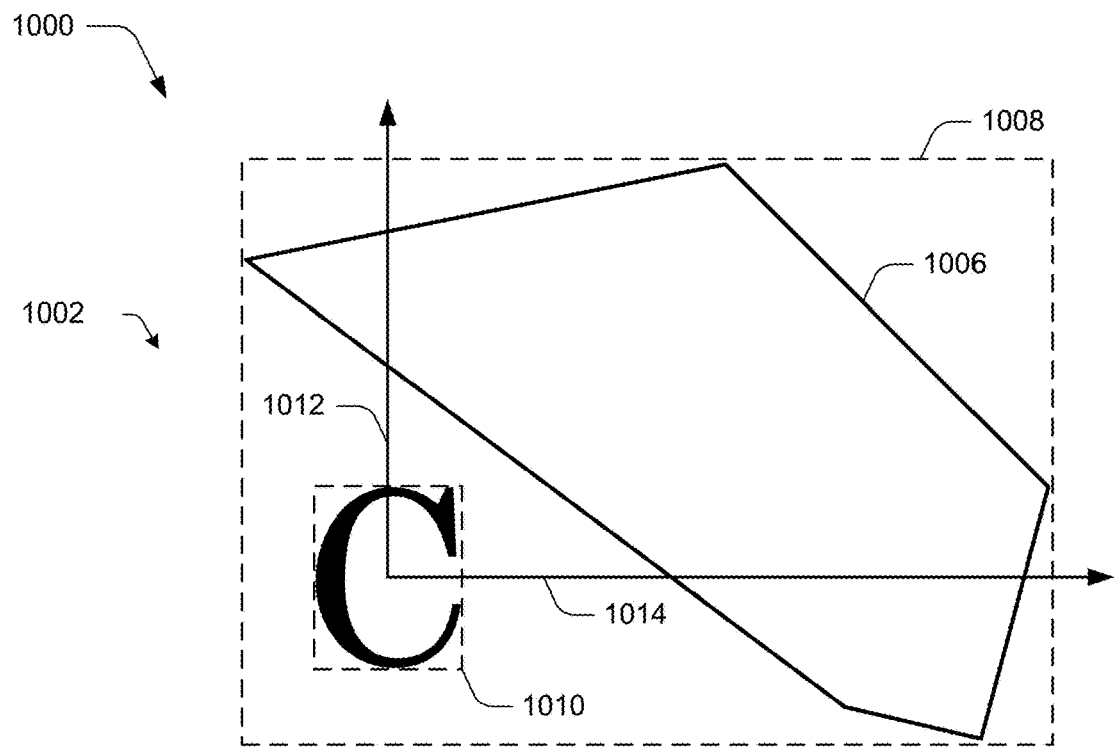
FIG. 10 depicts an example implementation of determining both whether a glyph intersects a path and whether a glyph is enclosed by a path in outputting a text selection.
Figure 10:
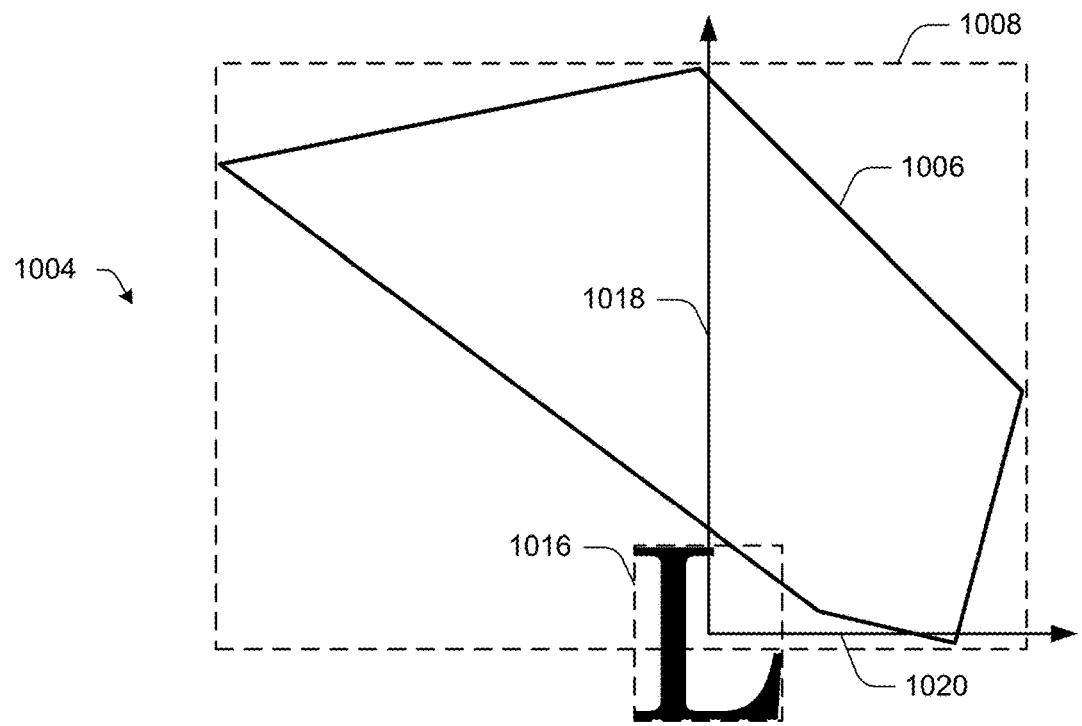

FIG. 10 illustrates an example 1000 of advantages enabled by the selective filtering of glyphs used to output a text selection 118, where the filtering involves first considering whether a selected glyph's bounding box 204 is outside a path bounding box 208, then considering whether the selected glyph's outline 206 intersects the path 112, before finally considering whether the selected glyph is displayed within an area enclosed by the path 112.

For instance, FIG. 10 depicts an example 1002 where considering only bounding boxes for a glyph and a path would incorrectly categorize the glyph as intersecting or being enclosed by the path. FIG. 10 also depicts an example 1004, where considering only a path and bounding boxes for a glyph and the path would incorrectly categorize the glyph as intersecting or being enclosed by the path.

In example 1002, a glyph "C" is depicted relative to a path 1006 with a path bounding box 1008. A position of the glyph "C" relative to the path 1006 is identified by bounding box 1010, which is disposed within the path bounding box 1008. While a consideration of only the relative positioning of the path bounding box 1008 and the bounding box 1010 might lead to an incorrect conclusion that the "C" glyph is encompassed by the path 1006, the text selection system 104 is configured to identify that the "C" glyph is disposed outside the area enclosed by the path 1006 via rays 1012 and 1014.

Similarly, in example 1004, a glyph "L" is depicted relative to the path 1006, where a bounding box 1016 for the glyph "L" intersects both the path 1006 and the path bounding box 1008. A consideration of the relative positioning of the path bounding box 1008 and the bounding box 1016 and intersections between the bounding box 1016 and both the path 1006 and path bounding box 1008 might lead to an incorrect conclusion that the "L" glyph intersects or is encompassed by the path 1006. However, the text selection system 104 is configured to both identify that the "L" glyph does not intersect the path 1006 using outline information for the glyph and identify that the "L" glyph is disposed outside the area enclosed by the path 1006 via rays 1018 and 1020.

Figure 11:
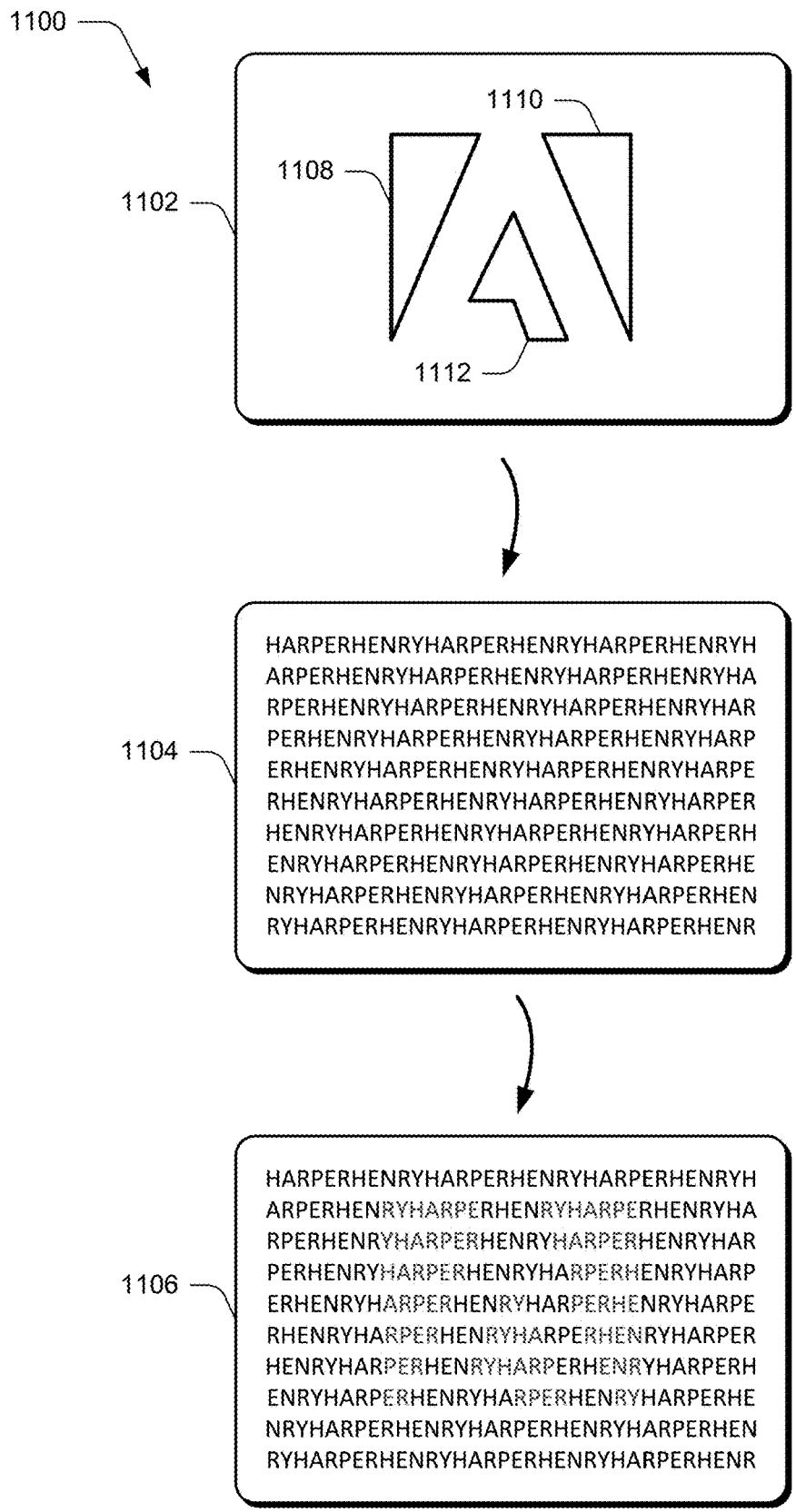
FIG. 11 depicts an example implementation of outputting a text selection for a plurality of different paths.

Although described above with respect to outputting glyphs in a text selection 118 according to a selection scope 210 for a single path 112, the techniques described herein are configured to output the text selection 118 for any number of paths specified by the user input 110. For instance, FIG. 11 depicts an example 1100 of user input 110 applying a vector object 1102 comprising a plurality of different paths to text content 1104 and a resulting text selection 1106 generated according to the plurality of different paths of the vector object.

Specifically, the vector object 1102 includes paths 1108, 1110, and 1112, where each of the paths 1108, 1110, and 1112 create an enclosed area. The text selection system 104 is configured to process each of the paths 1108, 1110, and 1112 as an individual path 112 using the techniques described above. In response to detecting a positioning of the vector object 1102 over the text content 1104 and input specifying a selection scope 210 of glyphs included in the enclosed areas of the paths 1108, 1110, and 1112, the text selection system 104 outputs the text selection 1106, which visually distinguishes glyphs of the text content 1104 displayed within the enclosed areas of the vector object 1102 from other glyphs of the text content 1104.

Thus, the text selection system 104 is configured to enable selection of glyphs from text content 106 according to one or more user-defined paths, without constraint regarding a geometry of the path or a formatting of the text content 106, thereby enabling selection of non-contiguous glyphs even on touch-input devices, which is not enabled by conventional text selection techniques.

Example System and Device

Figure 12:
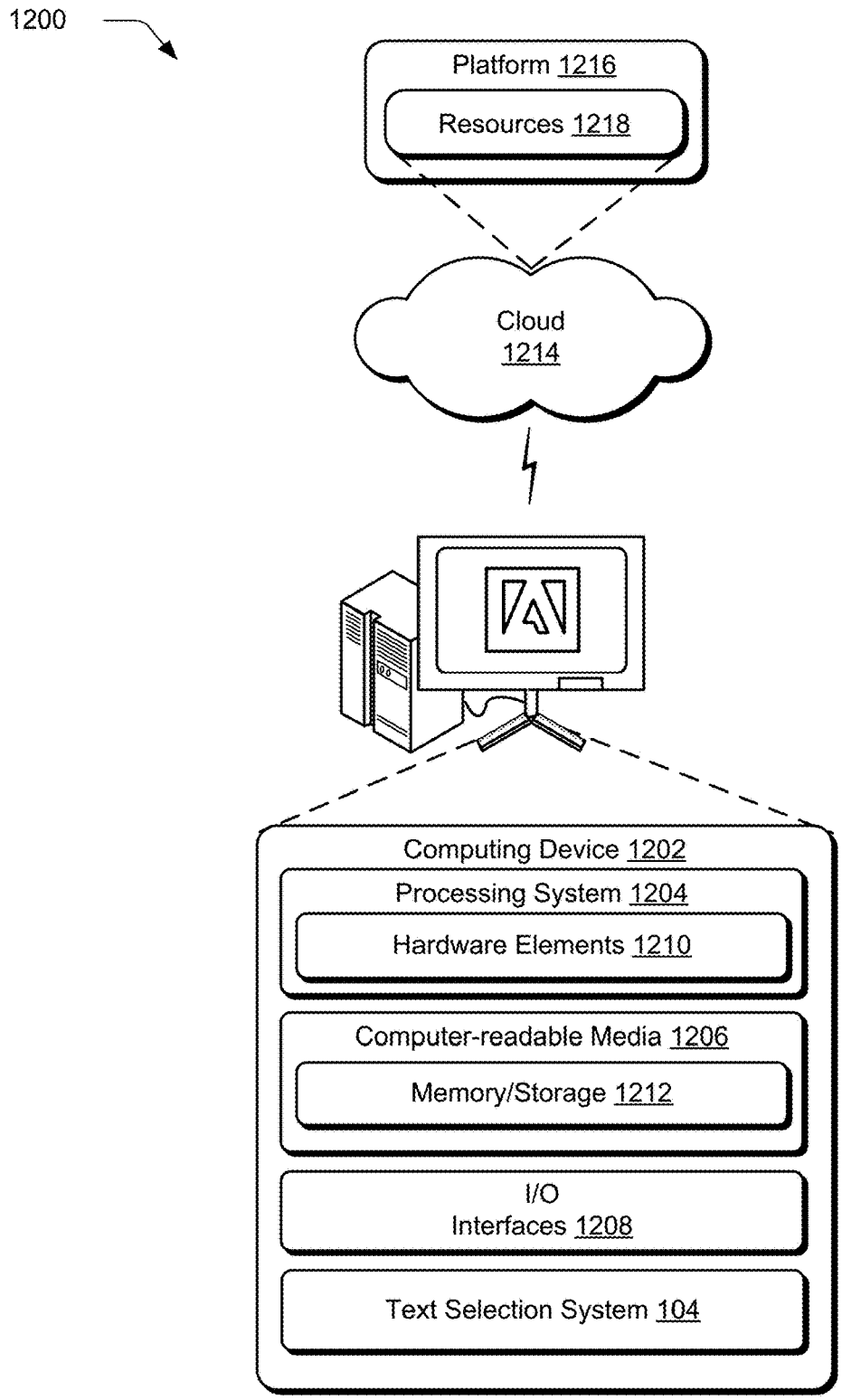
FIG. 12 illustrates an example system including various components of an example device that can be implemented as any type of computing device as described and/or utilize with reference to FIGS. 1-11 to implement embodiments of the techniques described herein.

FIG. 12 illustrates an example system 1200 that includes an example computing device 1202 that is representative of one or more computing systems and/or devices that implement the various techniques described herein. This is illustrated through inclusion of the text selection system 104. The computing device 1202 is configurable, for example, as a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that is configurable as processors, functional blocks, and so forth. This includes implementation in hardware as an application specific integrated circuit or other logic device formed using one or more semiconductors. The hardware elements 1210 are not limited by the materials from which they are formed, or the processing mechanisms employed therein. For example, processors are configurable as semiconductor(s) and/or transistors (e.g., electronic integrated circuits (ICs)). In such a context, processor-executable instructions are electronically executable instructions.

The computer-readable storage media 1206 is illustrated as including memory/storage 1212. The memory/storage 1212 represents memory/storage capacity associated with one or more computer-readable media. The memory/storage 1212 includes volatile media (such as random-access memory (RAM)) and/or nonvolatile media (such as read only memory (ROM), Flash memory, optical disks, magnetic disks, and so forth). The memory/storage 1212 includes fixed media (e.g., RAM, ROM, a fixed hard drive, and so on) as well as removable media (e.g., Flash memory, a removable hard drive, an optical disc, and so forth). The computer-readable media 1206 is configurable in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1202. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1202, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1210. The computing device 1202 is configured to implement particular instructions and/or functions corresponding to the software and/or hardware modules. Accordingly, implementation of a module that is executable by the computing device 1202 as software is achieved at least partially in hardware, e.g., through use of computer-readable storage media and/or hardware elements 1210 of the processing system 1204. The instructions and/or functions are executable/operable by one or more articles of manufacture (for example, one or more computing devices 1202 and/or processing systems 1204) to implement techniques, modules, and examples described herein.

The techniques described herein are supported by various configurations of the computing device 1202 and are not limited to the specific examples of the techniques described herein. This functionality is also implementable all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 abstracts resources and functions to connect the computing device 1202 with other computing devices. The platform 1216 also serves to abstract scaling of resources to provide a corresponding level of scale to encountered demand for the resources 1218 that are implemented via the platform 1216. Accordingly, in an interconnected device embodiment, implementation of functionality described herein is distributable throughout the system 1200. For example, the functionality is implementable in part on the computing device 1202 as well as via the platform 1216 that abstracts the functionality of the cloud 1214.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium text selection environment, a method implemented by a computing device, the method comprising:
   receiving, by the computing device, input specifying:
      at least one path relative to digital text content that includes a plurality of glyphs; and
      a text selection scope specifying a subset of the plurality of glyphs that intersect the at least one path for output as a text selection;
   identifying, by the computing device, an outline of each of the plurality of glyphs;
   determining, by the computing device, for each of the plurality of glyphs, whether the at least one path intersects the outline of the glyph;
   including, by the computing device, one of the plurality of glyphs in the text selection responsive to determining that the outline of the one of the plurality of glyphs intersects the at least one path; and
   excluding, by the computing device a different one of the plurality of glyphs from the text selection responsive to determining that:
      the outline of the different one of the plurality of glyphs is not disposed within an area defined by the at least one path;

the outline of the different one of the plurality of glyphs is not disposed outside the area defined by the at least one path; and the outline of the different one of the plurality of glyphs does not intersect the at least one path.

2. The method of claim 1, wherein receiving the input specifying the at least one path comprises receiving freeform drawing input at a user interface of the computing device.

3. The method of claim 1, wherein receiving the input specifying the at least one path comprises receiving a selection of a vector object that includes a plurality of different paths.

4. The method of claim 1, further comprising filtering, by the computing device, the plurality of glyphs prior to determining, for each of the plurality of glyphs, whether the at least one path intersects the outline of the glyph, the filtering comprising:
    identifying a bounding box for the at least one path;
    identifying a bounding box for each of the plurality of glyphs;
    determining, for each of the plurality of glyphs, whether the bounding box for the glyph is outside the bounding box for the at least one path; and
    excluding a glyph of the plurality of glyphs from a filtered subset of glyphs responsive to determining that the bounding box for the glyph is outside the bounding box for the at least one path, wherein determining whether the at least one path intersects the outline of the glyph is performed using the filtered subset of glyphs.

5. The method of claim 1, wherein determining whether the at least one path intersects the outline of the glyph is performed using a Bezier clipping algorithm configured to identify an intersection point between the at least one path and the outline of the glyph.

6. The method of claim 1, further comprising displaying an indication of the text selection in a user interface of the computing device that visually distinguishes glyphs of the digital text content included in the text selection from glyphs of the digital text content excluded from the text selection.

7. The method of claim 1, wherein the one of the plurality of glyphs and the different one of the plurality of glyphs are contiguous glyphs in the digital text content.

8. In a digital medium text selection environment, a system comprising:
    one or more processors; and
    a computer-readable storage medium storing instructions that are executable by the one or more processors to perform operations comprising:
    receiving input specifying:
        a path relative to digital text content that includes a plurality of glyphs; and
        a text selection scope specifying a subset of the plurality of glyphs displayed within in an area enclosed by the path for output as a text selection;
    identifying a bounding box for each of the plurality of glyphs;
    determining, for each of the plurality of glyphs, whether the glyph is displayed within the area enclosed by the path by casting a ray from a center of the bounding box for the glyph and identifying a number of intersections between the ray and the path; and
    including one of the plurality of glyphs in the text selection responsive to determining that the ray cast from the center of the bounding box for the glyph has an odd number of intersections with the path.

9. The system of claim 8, wherein receiving the input specifying the path comprises receiving freeform drawing input at a user interface of a computing device.

10. The system of claim 8, wherein receiving the input specifying the path comprises receiving a selection of a vector object that includes a first area enclosed by a first path and a second area enclosed by a second path, wherein determining whether the glyph is displayed within the area enclosed by the path comprises:
    casting a first ray from the center of the bounding box for the glyph through a center of the first area and identifying a number of intersections between the first ray and the first path;
    casting a second ray from the center of the bounding box for the glyph through a center of the second area and identifying a number of intersections between the first ray and the second path; and
    including the glyph in the text selection responsive to determining that the first ray has an odd number of intersections with the first path or determining that the second ray has an odd number of intersections with the second path.

11. The system of claim 8, the operations further comprising filtering the plurality of glyphs prior to determining whether the glyph is displayed within the area enclosed by the path by:
    identifying a bounding box for the path;
    determining, for each of the plurality of glyphs, whether the bounding box for the glyph is outside the bounding box for the path; and
    excluding one of the plurality of glyphs from a filtered subset of glyphs responsive to determining that the bounding box for the glyph is outside the bounding box of the path, wherein determining whether the glyph is displayed within the area enclosed by the path is performed using the filtered subset of glyphs.

12. The system of claim 8, the operations further comprising:
    identifying an outline of each of the plurality of glyphs;
    determining, for each of the plurality of glyphs, whether the path intersects the outline of the glyph; and
    including one of the plurality of glyphs in the text selection responsive to determining that the outline of the one of the plurality of glyphs intersects the path.

13. The system of claim 12, wherein determining whether the path intersects the outline of the glyph is performed using a Bezier clipping algorithm configured to identify an intersection point between the path and the outline of the glyph.

14. The system of claim 8, wherein the text selection includes non-contiguous glyphs of the digital text content.

15. The system of claim 8, the operations further comprising receiving input to invert the text selection and modifying the text selection to include a subset of the plurality of glyphs displayed outside the area enclosed by the path and exclude a subset of the plurality of glyphs displayed within the area enclosed by the path.

16. In a digital medium text selection environment, a method implemented by a computing device, the method comprising:
    receiving, by the computing device, input specifying:
        a path relative to digital text content that includes a plurality of glyphs; and
        a text selection scope specifying a subset of the plurality of glyphs displayed outside an area enclosed by the path for output as a text selection;

identifying, by the computing device, a bounding box for each of the plurality of glyphs;

determining, by the computing device, for each of the plurality of glyphs, whether the glyph is displayed outside the area enclosed by the path by casting a ray from a center of the bounding box for the glyph and identifying a number of intersections between the ray and the path; and including, by the computing device, one of the plurality of glyphs in the text selection responsive to determining that the ray cast from the center of the bounding box for the glyph has an even number of intersections with the path.

17. The method of claim 16, wherein receiving the input specifying the path comprises receiving a selection of a vector object that includes a first area enclosed by a first path and a second area enclosed by a second path, wherein determining whether the glyph is displayed outside the area enclosed by the path comprises:

casting a first ray from the center of the bounding box for the glyph through a center of the first area and identifying a number of intersections between the first ray and the first path;

casting a second ray from the center of the bounding box for the glyph through a center of the second area and identifying a number of intersections between the first ray and the second path; and including the glyph in the text selection responsive to determining that the first ray has an even number of intersections with the first path and determining that the second ray has an even number of intersections with the second path.

18. The method of claim 16, wherein identifying the bounding box for each of the plurality of glyphs and determining whether each of the plurality of glyphs is displayed outside the area enclosed by the path is performed independent of converting the digital text content to a digital image format.

19. The method of claim 16, further comprising:

identifying, by the computing device, an outline of each of the plurality of glyphs;

determining, by the computing device, for each of the plurality of glyphs, whether the path intersects the outline of the glyph; and excluding one of the plurality of glyphs from the text selection responsive to determining that the outline of the one of the plurality of glyphs intersects the path using a Bezier clipping algorithm.

20. The method of claim 16, wherein the text selection includes non-contiguous glyphs of the digital text content.

\* \* \* \* \*